April 5, 1960 | R. S. SINN | 2,931,916

DOCUMENT TRANSCRIBER

Filed Sept. 30, 1955 | 2 Sheets-Sheet 1

INVENTOR.
ROBERT S. SINN
BY Morris [signature]
ATTORNEY

April 5, 1960 R. S. SINN 2,931,916

DOCUMENT TRANSCRIBER

Filed Sept. 30, 1955

2 Sheets-Sheet 2

INVENTOR.
ROBERT S. SINN
BY Morris Rabkin
ATTORNEY

United States Patent Office 2,931,916

Patented Apr. 5, 1960

2,931,916

DOCUMENT TRANSCRIBER

Robert S. Sinn, Pennsauken, N.J., assignor to Radio Corporation of America, a corporation of Delaware Application September 30, 1955, Serial No. 537,710

10 Claims. (Cl. 250—219)

The present invention relates to document transcribing and automatic checking devices, and more particularly to an improved system for optically sensing a document and checking the sensed data.

Information may be stored on documents, such as record cards and paper tapes, in the form of perforations or printed spots. The perforations or spots may be arranged according to a code. Conversion of such stored information into corresponding electrical signals is necessary so that it can be used in information handling systems as, for example, computing machines, automatic control systems and automatic printing devices. A document transcriber is a device for performing this conversion operation.

Optical sensing devices using photoelectric transducers have been used in the past to develop the electrical signals needed to operate an associated information handling system. Elimination of errors resulting from the sensing operation has, however, been a major problem. The sensing system has been complicated by efforts to provide a checking and error determining function. A well known technique is to sense the entire record. Each character sensed is stored in a register. An auxiliary sensing system is provided for sensing the entire record a second time. Finally, all data received by the auxiliary sensing apparatus is compared, character for character, with the data stored in the register. Other electronic devices or mechanisms may be used to determine the source of any errors that may be revealed upon comparison.

Satisfactory operation has been obtained with document transcribers heretofore available. However, the cost and complexity of such transcribers leaves much to be desired in the way of simplification.

Accordingly, it is an object of the present invention to provide an improved document transcriber which incorporates automatic checking means.

It is a further object of the present invention to provide an improved optical sensing device which provides a simplified automatic checking function and which dispenses with a complete auxiliary optical sensing unit.

It is a still further object of the present invention to provide a document transcriber which uses fewer materials and which is lower in cost than document transcribers heretofore available.

With the present invention, the need for a complete auxiliary optical sensing arrangement has been eliminated. It has been found that the major sources of errors in the process of transcribing information stored on perforated and printed paper tapes, record cards, and the like lies in the electrical circuitry associated with the document transcriber. For example, errors may arise due to faulty photoelectric devices, electron tubes and other electronic components. The optical elements in the sensing apparatus very rarely cause an erroneous data signal. The optical components are ordinarily quite expensive. This makes the elimination of an entire optical sensing device highly desirable. The present invention has further provided a simplified error checking circuit for use in combination with a new and improved optical sensing device. Simplification of the checking circuit also aids in reducing the possibility of error by eliminating a number of electronic components.

According to the invention, a small area of the document in the region of one row of coded data is illuminated. A first array of photoelectric sensing devices is arranged to sense the coded information. For example, one photoelectric device may be provided for each column of coded information in the row. A second similar array of photoelectric devices may be arranged adjacent to the first array of photoelectric devices. An optical system is interposed between the document and the photoelectric device. This system is arranged so that each row of coded information is successively sensed by both arrays of photoelectric devices before the next row is sensed. The photoelectric devices or the document may be moved relative to each other so that successive sensing by each array of photoelectric devices occurs. A system for checking the sensed data for errors operates by introducing the proper amount of delay so that the output signals from each of the photoelectric devices that sense the same column are compared. If a character is properly sensed by both photoelectric devices, a signal is transmitted to the information handling system associated with the transcriber. However, if an error results, the source of this error is automatically indicated by the checking system.

The above mentioned and other objects of the present invention will be best understood and immediately suggest themselves to those skilled in the art to which the invention is directed from a reading of the following specification in connection with the accompanying drawing in which.

Figure 1:
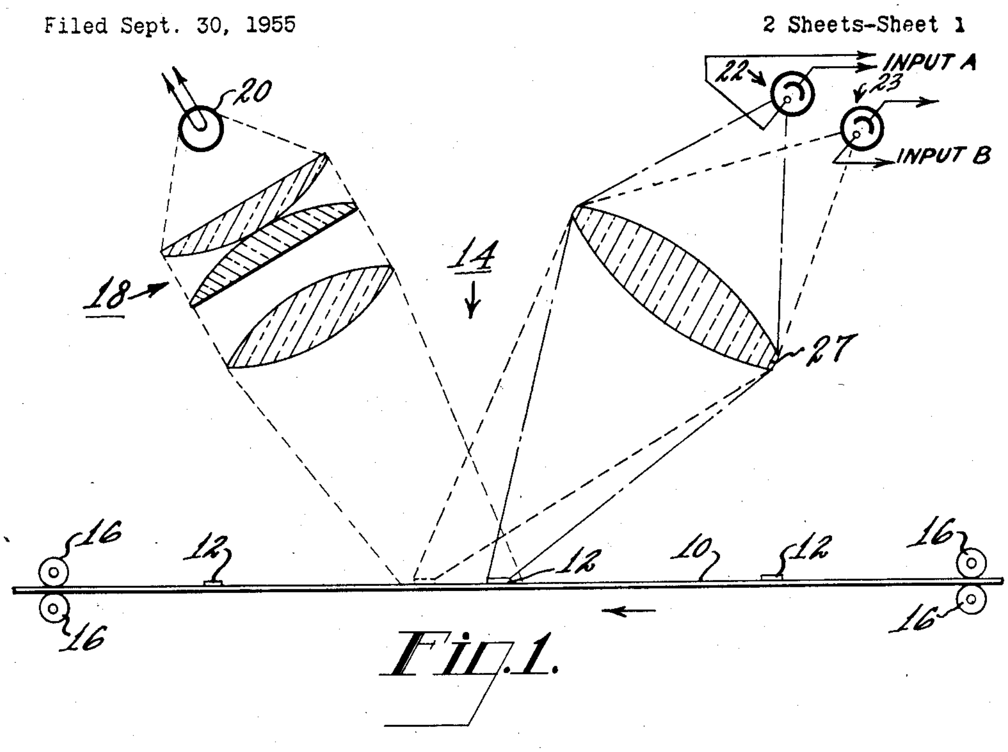
Figure 1 is a somewhat descriptive diagram, in elevation, of an illustrative form of the present invention.
Figure 2:
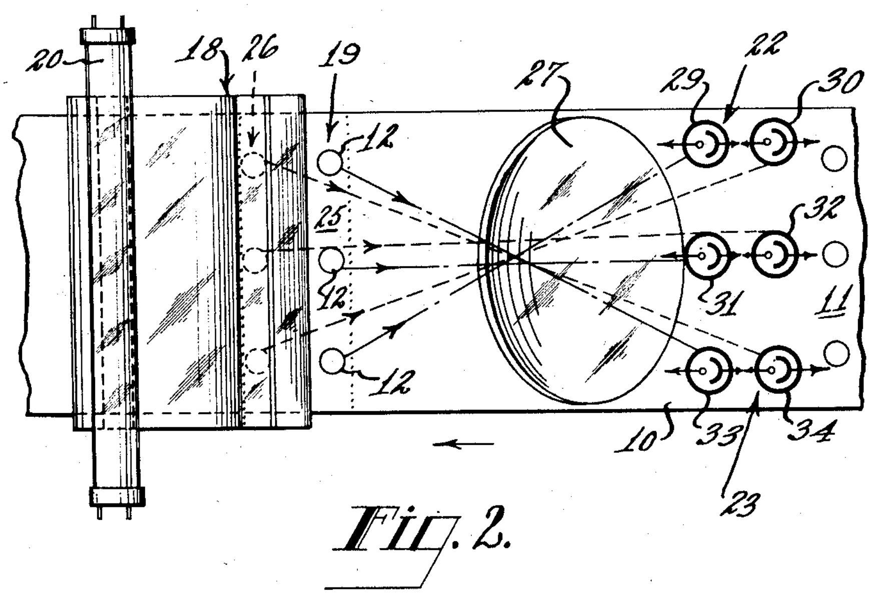
Figure 2 is a somewhat descriptive plan view of the illustrative form of the invention which is illustrated in Figure 1.

Referring now to Figures 1 and 2, a paper tape 10 having reflective spots 12 printed thereon is guided past a sensing station 14. The tape passes between several rollers 16. The spots 12 are arranged on the tape in successive, spaced rows 25 and 11. The paper tape 10 is a typical type of document on which information is stored for subsequent handling. The spots are shown as being raised above the upper lever of the tape 10 for ease of illustration and the height of the spots is exaggerated. However, it will be appreciated that, ordinarily, it will not be possible to determine that the spots are raised with the naked eye. In fact, the spots may be depressed into the tape as a result of the printing process.

Since the spots have different light transmission characteristics than the body of the tape, it will be possible to photoelectrically sense the occurrence of a spot by reflecting light therefrom. Although visible light is used in the illustrative embodiment, other forms of radiation, such as ultra-violet and infra-red may be used.

The invention provides an optical system 18 for projecting light from a source 20 onto a portion of the tape. The illuminated region is indicated on the drawing as being located between the dotted lines on the face of the tape 10. To fully illuminate the width of the tape, it is preferable that the light source be elongated. Consequently, a fluorescent lamp or an incandescent lamp having an elongated filament may be used. This lamp is connected, in the ordinary manner, to a source of power (not shown).

In the simplified illustrations of Figures 1 and 2, three spots are shown as being arranged along the width of the tape 10 on the same straight line row 25. The tape 10 is assumed to be moving in a direction from right to left as indicated by the arrow. The optical sensing station 14, as provided by the present invention, includes two separate arrays 22 and 23 of photoelectric sensing devices. Phototubes are used as the elements of the arrays. One phototube is provided in each array for every spot 12 that may be sensed. The spots 12 in each row are arranged in accordance with a code. It will be observed that the number of phototubes in each array 22 and 23 is equal to the maximum number of spots that may possibly exist in any one row. This is to assure that all of the possible spots are sensed. While phototubes are illustrated as the elements in each array 22 and 23, other photosensitive elements may be used, such as photosensitive semiconductor cells.

As mentioned previously, the spots 12 that are printed on the tape 10 are sensed by photoelectrically detecting the light rays reflected from the spots. In the present invention, it is proposed to simultaneously sense all of the spots in one row of spots. Also, in accordance with the invention, each row of spots is sensed twice before the next row is sensed. A spot is first sensed when it is located at one position on the tape. Then the same spot is sensed again after the tape has moved so that the row 25 of spots assumes a second position. In the drawing, the central row 25 of spots is shown as being in the first sensing position 19. The second sensing position 26 is to the left of the first sensing position 19. The central row 25 of spots moves into the second sensing position 26 as the tape 10 moves to the left. The spots 12 in the central row 25 of spots are indicated on the drawing by dashed lines when they are located in the second sensing position 26.

One of the phototube arrays 22 is provided to sense the reflected light from the spots in the central row 25 of spots when that row is located in the first sensing position 19. The other array 23 of phototubes is disposed to sense the spots in the central row 25 of spots when the tape moves and that row assumes the second sensing position 26. An optical system is provided to focus the reflected light from every spot in the row upon an associated phototube. The optical system is illustrated herein as being a simple converging lens 27.

It is desirable, in accordance with the invention, to sense the row 25 of spots at two positions 19 and 26 which are separated linearly from each other by a short distance. The spots will be located in the plane of the tape 10 in both sensing positions 19 and 26. All the phototubes 29, 31 and 33 in the array 22, which senses the row at the first sensing position 19, are, therefore, located along the same line. The phototubes in the other array 23 that senses the row 25 in the second sensing position 26, also, are located along a single line. The linear arrays 22 and 23 of phototubes are located in parallel spaced planes. It will be seen from optical relationships that the distance between these parallel planes is proportional to the separation of the sensing position. The focal length of the lens 27, that is selected, is the principal factor in determining the spacing of the arrays 22 and 23 from the tape 10.

The sensing process may be seen to be both simple and effective. When the row 25 moves into the first sensing position 19, all of the spots 12 therein are illuminated by the light projected upon the tape from the source 20 of light. The path of reflected light rays is through the lens 27. For example, the light ray path from spot 12 that is located near the lower edge of the tape 10, as indicated in Figure 2 by a line composed of long and short dashes, passes through the lens 27 and is reflected so that the ray intercepts a phototube 29 in the first array 22. This phototube 29 is located near the upper edge of the tape, as viewed in Figure 2 of the drawing. Similarly, this same spot 12 is sensed by the phototube 30 which is located in the other array 23 of phototubes. This phototube 30 is, also, positioned near the upper edge of the tape as viewed in Figure 2. The reflected light ray path from this spot 12 in the second sensing position 26 is indicated in the drawing by a dashed line.

The phototubes 29 and 30, which are located in different arrays 22 and 23, sense the spot 12 which is located near the lower edge of the tape 10. The phototube 29 in one of the arrays 22 senses the spot 12 when it is disposed in the first sensing position 19, and the phototube 30 that is located in the other array 23 senses the same spot 12 when it is disposed in the second sensing position 26. These phototubes 29 and 30 sense the same spot successively. They may be referred to as a cooperating pair of phototubes.

As indicated in the drawing by the dashed lines showing light ray paths, other phototubes in both arrays are disposed to sense the same spot successively as it travels from the first to the second sensing positions. Therefore, the phototubes 31 and 32 which are disposed in different arrays 22 and 23, respectively, form another cooperating pair, and the remaining phototubes 33 and 34 form still another cooperating pair of phototubes.

The second array of phototubes 23 is provided to perform a checking function. Repeated sensing results in a very much greater chance of detecting an error. Consequently, plural sensing means are provided. In the illustrative example, three output signals are produced by the phototubes 29, 31, and 33 in the first array 22 corresponding to the three spots 12 in the row 25. Assuming that the sensing station 14 is operating properly, three similar signals will be provided from the three phototubes 30, 32 and 34 in the other array 23 of phototubes. Since the tape travels at a constant velocity and the distance between the sensing positions 19 and 26 is fixed, the signals from the second array of phototubes 23 will be delayed for a definite time after the occurrence of the signals from the first array 22 of phototubes. In other words, if the sensing station 14 is operating properly, the same signal will be transmitted, after a short time interval by the phototubes in each of the cooperating pairs of phototubes. It may be observed therefore, that if the signal output from the phototubes in the sensing station 14 is not a repetitive signal, an error due to a fault in the sensing station is indicated.

Figure 3:
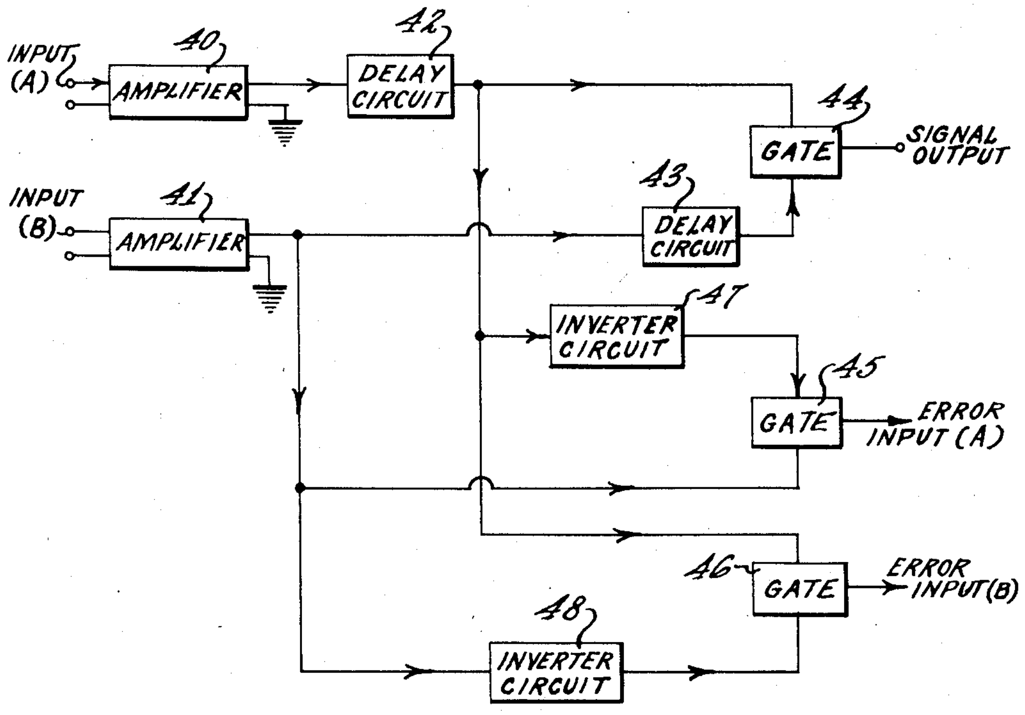
Figure 3 is a schematic diagram of the electrical system which may be used in combination with the optical sensing arrangement illustrated in Figures 1 and 2.

To determine the existence and the origin of any errors in the sensing process, an electronic error checking system, such as the system illustrated in Figure 3, may be provided. A system similar to the system of Figure 3 is used for each cooperating pair of phototubes. Therefore, there are three similar systems in the illustrated document transcriber, one such system is described herein.

The output of a phototube 29 in the first array 22 is designated in the drawing as input (A). The output of the cooperating phototube 30 from the other array 23 will be designated as input (B). The first input (A) is applied to an amplifier 40. The other input (B) is applied to another amplifier 41.

It will be remembered that the output signals from the cooperating pair of phototubes 29 and 30 are separated by a given time delay that is determined by the velocity of the tape and the distance between the sensing positions, 19 and 26. In order to compare the output signals, it will be desirable to delay the earlier occurring signal. The given time interval may be less than one millisecond so that an electronic delay circuit of any well known type may be utilized. For example, a monostable multivibrator may be provided to function as a delay circuit. Consequently, a delay circuit 42 is connected to the output of the amplifier that receives the first occurring input signal (A).

It may be desirable to connect another delay circuit 43 to the output of the other amplifier 41. The signal from the output of the amplifier 41 that is connected to input (B) will coincide with the signal from the output of the delay circuit 42 connected to the other amplifier 40. The delay circuit 43 provides a small amount of delay so that the output signal corresponding to the input (B), which is provided by the delay circuit 43, no longer exactly coincides with the output signal from the delay circuit 42, but overlaps this signal.

The outputs of both delay circuits 42 and 43 are applied to a gate circuit 44. Gate circuits are well known and suitable types thereof are described in chapter 4 of the text "High Speed Computing Devices," published by McGraw-Hill Book Company (1950). This gate circuit 44 may be designed to be operative and transmit a signal output only when coincident signals of a predetermined duration are applied to it. Consequently, the gate circuit 44 is designed to pass signals having a duration equal in time to the signal overlap that is produced because of the additional delay circuit 43. By providing a gate circuit 44 of this type and the additional delay circuit, a possible error condition resulting from a noise impulse that occurs simultaneously with the occurrence of a signal at one of the inputs (A or B) is eliminated.

The illustrative system features means for indicating the source of any error. For example, if a signal is applied to input (A) but no signal is applied to input (B), an output no longer is provided from gate circuit 44. Instead, an output is provided at the next gate circuit 46. Similarly, the loss of input signal at input (A), when the signal is applied at input (B), produces an output signal only from the gate circuit 45.

Circuits of the "and-not" type are provided so that these error signals will be indicated. A first "and-not" circuit is provided by the inverter circuit 47 and the gate circuit 45. This circuit identifies an error in input (A). The other "and-not" circuit is provided by the remaining inverter circuit 48 and gate circuit 46. An error in input (B) is identified by the last mentioned circuit.

In the circuit that identifies an error in input (A), the inverter circuit 47 is connected between one side of the gate 45 and the delay circuit 42. The other side of the gate 45 is connected to the output of the amplifier 41 in the other input (B) channel.

For identifying an error in input (B), the inverter circuit is connected between one side of the remaining gate 46 and the output of the input (B) channel amplifier 41. The other side of the gate 46 is connected to the delay circuit 42 output.

The inverter circuits 47 and 48 may be direct-current amplifiers. These amplifiers are designed to produce a voltage level at their output which is below that required to initiate operation of the gate circuits 45 and 46. When no signal is applied to the input of the inverter circuits, the output voltage level increases to a magnitude sufficient to permit operation of the associated gate circuits 45 and 46. Therefore, when there is an input signal applied at input (B), but no input signal applied at input (A), the gate circuit 45 provides an output signal indicative of an error in input (A). The gate circuit 46 is operative to pass a signal to indicate an error in input (B), when a signal is applied to input (A) and no signal is applied to input (B).

The output of the first gate circuit 44 is the signal output. The signal output may be applied to an associated information handling system such as a computer or electromechanical printer. The output sides of the gate circuits 45 and 46 may be connected to suitable alarm circuits that will indicate, to the operator of the sensing system, that an error has occurred in one of the inputs. Automatic devices for stopping the motion of the tape may also be actuated in response to an error signal.

What is claimed is:

1. A document transcriber for changing into electrical signals information stored on a document in the form of discrete areas having different light transmission characteristics from the body of said document, said areas being arranged on the document in successive, spaced lines, said transcriber comprising two separate photoelectric sensing means, means common to both of said separate sensing means for directing the light ray paths from said areas in one of said lines to intercept successively each of said separate sensing means as said document moves relative to said sensing means before the next of said lines is sensed whereby successive electrical signals are produced by each of said sensing means, and means responsive to said electrical signals for indicating an error condition when said signals are not similar.

2. A document transcriber providing electrical signals from data stored on documents in the form of discrete areas, said areas possessing light transmission characteristics different from the body of the document, comprising a single sensing station including separate spaced groups of photoelectric sensing devices, different ones of said devices in one of said separate groups forming cooperating pairs with corresponding ones of said devices in the other of said separate groups, means for effecting relative motion between said document and said station, said groups in said station being arranged along adjacent light ray paths from said document so that the light rays from the same one of said discrete areas successively intercepts different elements of one of said pairs during said relative motion, and error checking means associated with said cooperating pairs for comparing the signal output of said devices in each of said cooperating pairs.

3. Equipment for converting into electrical signals data stored on documents in the form of discrete areas having light reflecting characteristics different from the body of the document, said equipment comprising a pair of cooperating photoelectric means for providing electrical signals corresponding to light that is incident thereon, means including an optical system common to said pair and interposed between said photoelectric means and said document for directing light rays reflected from the same one of said discrete areas successively to each of said photoelectric means as said document moves relative to said photoelectric means, whereby said area is successively sensed and successive electrical signals produced, and means responsive to said successive signals for determining the occurrence of an error in the sensing process by a comparison of said signals.

4. Equipment for converting into electrical signals data stored on documents in the form of discrete areas having light transmission characteristics different from the body of the document, said areas being arranged in rows, said equipment comprising pairs of cooperating photoelectric sensing devices for providing electrical signals corresponding to light that is incident thereon, means including an optical system interposed between said photoelectric devices and said document for directing light rays from the same one of said discrete areas in said row successively onto each of said photoelectric devices of the corresponding one of said pairs as said document moves relative to said sensing devices, whereby said area is successively sensed and successive electrical signals produced, and means for determining the occurrence of an error in the sensing process by comparison of the pair of said signals produced by each of said pairs of devices.

5. A document transcriber for converting into electrical signals, data stored on a document in the form of areas having different light transmission characteristics from the body of said document, said areas being located in different positions on said document in accordance with a code, and comprising means for illuminating a portion of said document, a single optical sensing station, said station including an optical system and two groups of photosensitive elements, said elements in each of said groups providing an individual output signal when activated, different individual elements in each group forming one of a cooperating pair thereof, means for effecting relative motion between said document and said sensing station, said optical system being arranged along the light ray paths from said document to said groups of photosensitive elements to orient the light rays from different ones of said areas so that each of said photosensitive elements in a different one of said cooperating pairs successively intercept the same one of said paths, and means for comparing the electrical signal output of said elements in each of said cooperating pairs of elements.

6. A document transcriber for converting into electrical signals data stored on documents in the form of areas having different light transmission characteristics from the body of the document, said areas being located in spaced rows on said document, and comprising means for illuminating a portion of said document containing one of said rows, a single optical sensing station, said station including two groups of photosensitive elements and an optical system common thereto, each of said elements providing an electrical signal output when activated by a light ray, different elements in one of said groups being paired with different ones of said elements in the other of said groups, each pair of said elements corresponding to a different column on said document, means for effecting relative motion between said document and said sensing station, said optical system being disposed between said document and said groups of photosensitive elements to orient the light ray paths from different ones of said areas in one of said rows so that said last-named ray paths are successively incident on each of said photosensitive elements of said pairs selectively as said station and said document assume different relative positions, and means for comparing said electrical signal output of each of said elements with the output of the other of said elements in that pair.

7. A document transcriber for converting into corresponding electrical signals, information stored on a document in the form of discrete areas having light transmission characteristics differing from the light transmission characteristics of the body of said document, said areas being arranged in accordance with a code at different positions on said document, said transcriber comprising means for projecting light upon a portion of said document, a first arrangement of photosensitive elements, a second arrangement of photosensitive elements spaced from said first arrangement, an optical system for directing light rays that are incident upon certain ones of said discrete areas, said optical system being movable with respect to said document to assume a first position and a second position with respect thereto where in said first position said light rays are directed to individually intercept different ones of said photosensitive elements in said first array whereby a first group of electrical signals corresponding to said code are produced, and where in said second position said light rays are directed to individually intercept different ones of said photosensitive elements in said second array whereby a second group of electrical signals repetitive of said first group are produced, and means responsive to said signals for checking errors occurring during the information conversion processes that reveal dissimilarities among said signals by comparing said repetitive signals in said two groups of electrical signals.

8. A document transcriber for converting information stored, in the form of reflective spots arranged in parallel spaced rows, on a document into corresponding electrical signals comprising means for projecting light upon a portion of said document; a single station for sensing said document including a first array of photosensitive elements, a second array of photosensitive elements spaced from said first array, and an optical system; means for moving said document relative to said station; said optical system being disposed in the path of light rays reflected from said spots for directing said reflected light rays from different ones of said spots in one of said rows individually to intercept different ones of said photosensitive elements in said first array when said document is in a first sensing position; said optical system also directing said reflected light rays from said different ones of said spots individually to intercept different ones of said elements in said second array when said document is in a second sensing position whereby repetitive group of electrical signals are produced when each of said rows are sensed; said first and said second sensing positions being spaced from each other by predetermined distance shorter than the distance between said spaced rows; and means connected to each of said photosensitive elements for checking for errors during the information conversion processes by comparing individual repetitive signals corresponding to the same one of said spots to determine dissimilarities therebetween.

9. A document transcriber for changing into electrical signals information stored in parallel rows on a document as discrete areas of higher light reflectivity than the body of said document, said transcriber comprising two separate photoelectric sensing means, a source of light providing light rays incident upon selected parallel paths of said document, and means for directing the light rays reflected by said areas in one of said rows to intercept successively each of said separate sensing means as said document moves relative to said sensing means.

10. The transcriber set forth in claim 9 including means responsive to the outputs of said separate sensing means for indicating an error condition when the outputs of said separate sensing means corresponding to the same discrete area are dissimilar.

References Cited in the file of this patent

UNITED STATES PATENTS

| | | |
|---|---|---|
| 1,789,686 | Ranger | Jan. 20, 1931 |
| 2,287,965 | Borberg | June 30, 1942 |
| 2,696,565 | Shockley | Dec. 7, 1954 |
| 2,702,380 | Brustman et al. | Feb. 15, 1955 |
| 2,712,898 | Knutsen | July 12, 1955 |
| 2,769,379 | Perry | Nov. 6, 1956 |